United States Patent
Katou et al.

(10) Patent No.: US 6,452,539 B2
(45) Date of Patent: Sep. 17, 2002

(54) APPARATUS AND METHOD FOR CONTROLLING RADIATION OF ELECTRIC WAVES

(75) Inventors: Hironori Katou; Shuji Kawabata; Hiroki Kumagai, all of Tokyo (JP)

(73) Assignee: NEC Toshiba Space Systems, Ltd. (JP)

( * ) Notice: Subject to any disclaimer, the term of this patent is extended or adjusted under 35 U.S.C. 154(b) by 0 days.

(21) Appl. No.: 09/730,424

(22) Filed: Dec. 5, 2000

(30) Foreign Application Priority Data

Dec. 6, 1999 (JO) .......................................... 11-346171

(51) Int. Cl.[7] .............................................. H04B 7/185
(52) U.S. Cl. ..................................................... 342/352
(58) Field of Search ................................ 342/352, 359, 342/367

(56) References Cited

U.S. PATENT DOCUMENTS 4,187,506 A * 2/1980 Frosch et al. ............... 310/306

FOREIGN PATENT DOCUMENTS

| JP | 60-145378 | 9/1985 |
| JP | 9-257914 | 10/1997 |
| JP | 10-70504 | 3/1998 |
| JP | 11-83987 | 3/1999 |
| JP | 2910619 | 4/1999 |

OTHER PUBLICATIONS

English Translation of JP 2910619–B2.*

* cited by examiner

Primary Examiner—Thomas H. Tarcza
Assistant Examiner—Fred Mull
(74) Attorney, Agent, or Firm—Dickstein, Shapiro, Morin & Oshinsky, LLP

(57) ABSTRACT

An electromagnetic wave radiation control apparatus includes an antenna, a modulator, an amplifier, and a radiation control unit. The modulator modulates a carrier wave based on a transmission signal to output a modulated signal, wherein the modulator stops the output of the modulated signal in response to a power off command. The amplifier amplifies the modulated signal such that the amplified signal is radiated as electromagnetic wave from the antenna, when the modulated signal is outputted from the modulator. The radiation control unit generates the power off command to the modulator, when radiation of electromagnetic wave in a current radiation direction of the antenna is inhibited, or when a level of a reception signal by the antenna is equal to or lower than a predetermined minimum level.

18 Claims, 4 Drawing Sheets

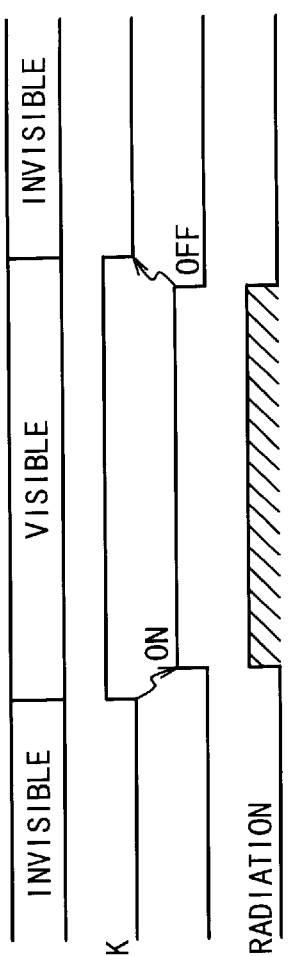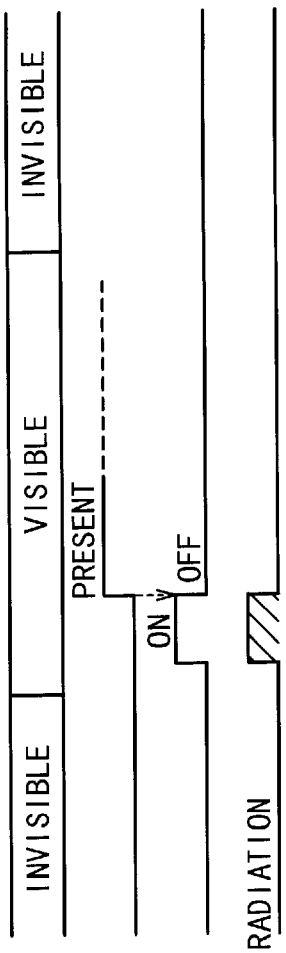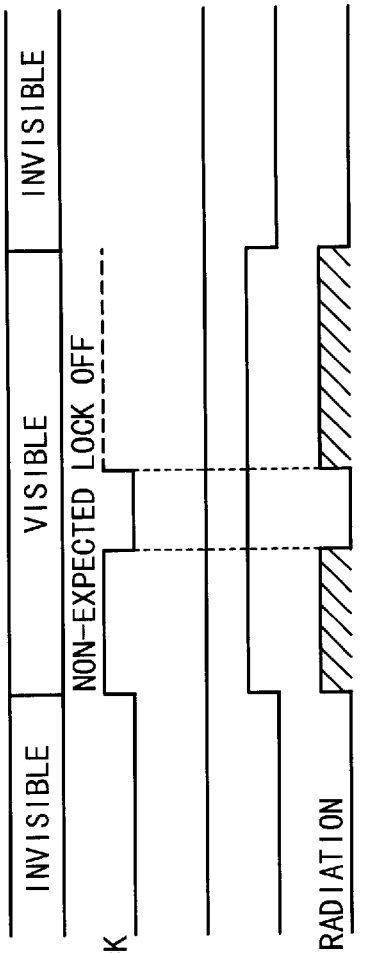

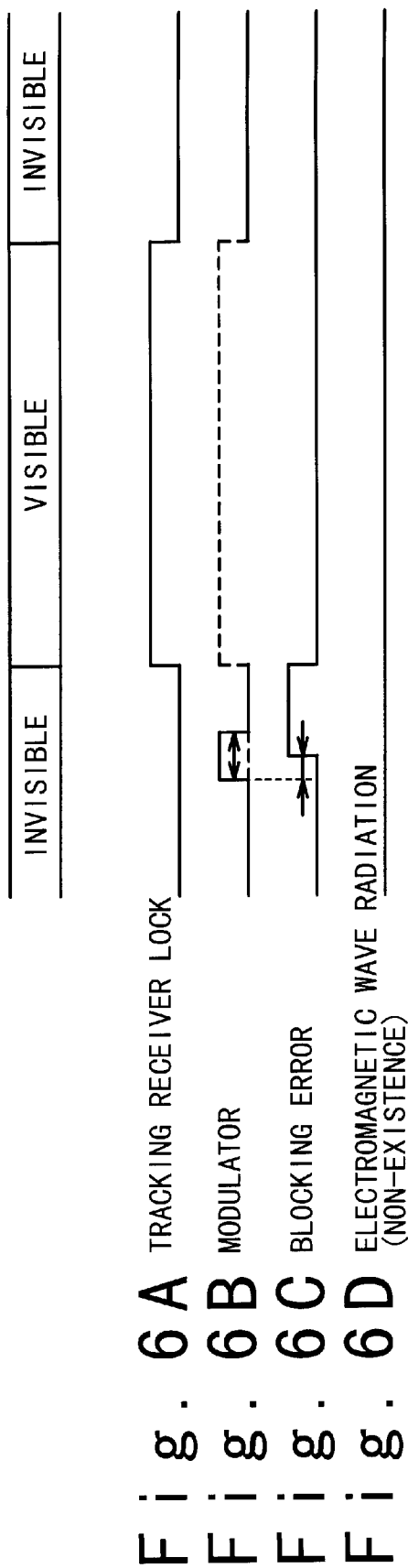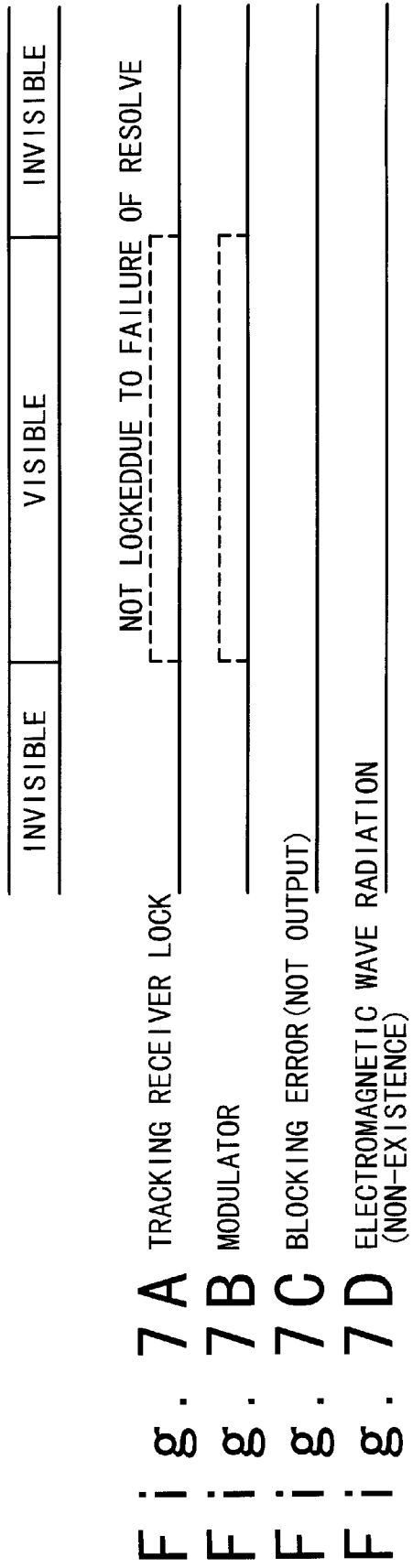

APPARATUS AND METHOD FOR CONTROLLING RADIATION OF ELECTRIC WAVES

BACKGROUND OF THE INVENTION

1. Field of the Invention

The present invention relates to an apparatus and method for controlling the radiation of electromagnetic wave. More particularly, the invention relates to a technique for preventing the radiation of electromagnetic wave to a specific region.

2. Description of the Related Art

High level safety needs to be secured in a spacecraft and a manned space station, and it is demanded that the electromagnetic wave emitted from an antenna on the spacecraft should have the electric field strength of 100 V/m or less with respect to human. However, the main lobe of each antenna is usually greater than 100 V/m. Therefore, various measures are taken to attain the safety required. For example, mechanical stoppers of the antenna pointing mechanism are attached for the windows of the manned spacecraft. The following techniques are known for eliminating the influence of the radiation of electromagnetic wave.

For example, in "Apparatus for Preventing Radiation Hazard" disclosed in Japanese Laid Open Patent Application (JP-A-Heisei 9-257914), a reception antenna is provided at a place such as a staying location of a human being where harmful microwave should be not applied, to detect microwave. When the antenna receives the microwave, the radiation of the microwave from a radar apparatus is stopped, thereby protecting human being from the radiation of microwave.

Also, in "Apparatus for Preventing Radiation Hazard" disclosed in Japanese Laid Open Patent Application (JP-A-Heisei 11-83987), a means for detecting radiation of microwave to a staying place of the human being is provided to monitor the radiation of the microwave. When the microwave is detected, the operation of only the radar apparatus as a radiation source is stopped. If the microwave emitted from any external source is detected, this fact is notified to the external source. In this method, any radar apparatuses other than the radar apparatus which erroneously radiates the microwaves are not stopped, though the microwave are detrimental to man.

Further, Japanese Patent No. 2910619 discloses "System for stopping Power Supply for Radio Transmission". The system is applied to a radio communication system in which data is transmitted in two ways between the first and second radio communication apparatuses of the same structure, by use of signals having a frequency higher than the microwave-band frequency. More specifically, the first radio communication apparatus receives the signal from the second radio communication apparatus and detects the level of the signal. When the first radio communication apparatus detects that the level of the signal received has remained equal to or below a predetermined value and the state of the low reception signal level continues longer than a predetermined time, the power supply to the second radio communication apparatus is interrupted. Thereafter, the power is intermittently supplied to the second radio communication apparatus for every prescribed period. At this time, when the level of the reception signal exceeds a predetermined value, power is then continuously supplied to the second radio communication apparatus. Thus, in the bidirectional radio communication system in which microwave or electromagnetic wave of shorter wavelength is used, the transmission output of the radio communication apparatus can be automatically stopped, when there is high possibility that people are exposed to the electromagnetic wave. This protects human being from the radiation of electromagnetic wave.

It should be noted that in "Aircraft Radar Apparatus" disclosed in Japanese Laid Open Utility Model application (JU-A-Showa 60-145378), while a aircraft stays on the ground, a signal representing an EL angle of an antenna on the aircraft is inputted into a radar apparatus. When the signal indicates that the EL angle has become smaller than a preset value, the high power radiation of the electromagnetic wave from the antenna is suppressed. Hence, the ground staff can inspect and repair the radar apparatus, without being influenced by the electromagnetic wave.

Also, in "Mobile Communication Apparatus" disclosed in Japanese Laid Open Patent Application (JP-A-Heisei 10-70504), the mobile communication apparatus is composed of an antenna, a tracking unit, a receiver, a transmitter, a handset, and a control unit. The antenna receives and transmits electromagnetic wave. The tracking unit directs the antenna to the coming electromagnetic wave. The receiver demodulates the electromagnetic wave. The transmitter modulates data to be transmitted into electromagnetic wave. The handset displays data to the user and receives instructions from the user. The control unit controls the tracking unit, receiver, transmitter and handset. The control unit, which is essential to the apparatus, is composed of measurement means, display means, and hazard inferring means. These means quickly solve reception troubles that may frequently take place in the communication section provided in the mobile communication apparatus.

As described above, mechanical stoppers are attached to the windows of a spacecraft to attain the safety required in the spacecraft. Whether or not electromagnetic wave from the antenna is radiated to the other parts of the spacecraft, which are provided with no stoppers, is determined by means of software control. Therefore, various design requirements must be fulfilled to enhance the safety in the spacecraft.

It should be noted that "Apparatus for Preventing Radiation Hazard" disclosed in Japanese Laid Open Patent Application (JP-A-Heisei 9-257914) and "Apparatus for Preventing Radiation Hazard" disclosed Japanese Laid Open Patent Application (JP-A-Heisei 11-83987) have an antenna for detecting electromagnetic wave, which is specially provided. Consequently, the apparatus is complex and the manufacturing cost of the apparatus is high.

Also, in "System for Interrupting Power Supply to Radio Transmitters" disclosed in Japanese Patent No. 2,910,619, whether electromagnetic wave should be radiated or not is determined in accordance with the level of a signal received by the antenna and the period for which the signal remains at the level. Therefore, it cannot be said that the safety is sufficient.

SUMMARY OF THE INVENTION

Therefore, an object of the present invention is to provide an apparatus and method for controlling the radiation of electromagnetic wave, which have a simple structure and is realized at low cost.

Another object of the present invention is to provide an apparatus and method for controlling the radiation of electromagnetic wave, which can yet serve to accomplish sufficient safety.

In order to achieve an aspect of the present invention, a electromagnetic wave radiation control apparatus includes an antenna, a modulator, an amplifier, and a radiation control unit. The modulator modulates a carrier wave based on a transmission signal to output a modulated signal, wherein the modulator stops the output of the modulated signal in response to a power off command. The amplifier amplifies the modulated signal such that the amplified signal is radiated as electromagnetic wave from the antenna, when the modulated signal is outputted from the modulator. The radiation control unit generates the power off command to the modulator, when radiation of electromagnetic wave in a current radiation direction of the antenna is inhibited, or when a level of a reception signal by the antenna is equal to or lower than a predetermined minimum level.

Here, the radiation control unit includes a data processor which outputs the power off command in response to an error signal, and a control unit. The control unit generates the error signal to the data processor, when radiation of electromagnetic wave in the current radiation direction of the antenna is inhibited, or when the reception signal level by the antenna is equal to or lower than the predetermined minimum level. In this case, the control unit may include a blocking state determining unit, a lock status determining unit and a logic circuit. The blocking state determining unit generates a blocking error signal when radiation of electromagnetic wave in the current radiation direction of the antenna is inhibited. The lock status determining unit generates an unlock signal when the reception signal level is equal to or lower than the predetermined minimum level. The logic circuit generates the error signal based on the blocking error signal and the unlock signal.

Also, the radiation control unit may further generate a high voltage power off command to the amplifier, when the amplified signal is outputted from the amplifier in a state in which the power off command can be generated. The amplifier stops an operation thereof in response to the high voltage power off command such that the amplified signal is not outputted to the antenna. The radiation control unit generates the high voltage power off command to the amplifier, when the radiation of electromagnetic wave in the current radiation direction of the antenna is inhibited, and when the amplifier outputs the amplified signal. The radiation control unit may include a data processor and a control unit. The data processor outputs the power off command in response to an error signal. The control unit generates the error signal to the data processor, when radiation of electromagnetic wave in the current radiation direction of the antenna is inhibited, or when the reception signal level by the antenna is equal to or lower than the predetermined minimum level, and the high voltage power off command to the amplifier, when the amplified signal is outputted from the amplifier in the state in which the radiation of electromagnetic wave in said current radiation direction of said antenna is inhibited. In this case, the control unit may include a blocking state determining unit, a lock status determining unit and a logic circuit. The blocking state determining unit generates a blocking error signal when radiation of electromagnetic wave in the current radiation direction of the antenna is inhibited, and the high voltage power off command to the amplifier, when the amplified signal is outputted from the amplifier in the state in which the radiation of electromagnetic wave in said current radiation direction of said antenna is inhibited. The lock status determining unit generates an unlock signal when the reception signal level is equal to or lower than the predetermined minimum level. The logic circuit generates the error signal based on the blocking error signal and the unlock signal.

Another aspect of the present invention is directed to a method of controlling radiation of electromagnetic wave in which a spacecraft which includes an antenna, a modulator which modulates a carrier wave based on a transmission signal to output a modulated signal, and an amplifier which amplifies the modulated signal such that the amplified signal is radiated as electromagnetic wave from the antenna, when the modulated signal is outputted from the modulator. The method is attained by (a) determining whether radiation of electromagnetic wave in a current radiation direction of the antenna is inhibited; by (b) determining a level of a reception signal by the antenna is equal to or lower than a predetermined minimum level; and by (c) generating a power off command to the modulator such that the modulator stops the output of the modulated signal to the amplifier, when the radiation of electromagnetic wave in the current radiation direction of the antenna is inhibited, or when the reception signal level is equal to or lower than the predetermined minimum level.

The (c) generating may be attained by (d) generating an error signal to the data processor, when the radiation of electromagnetic wave in the current radiation direction of the antenna is inhibited, or when the reception signal level by the antenna is equal to or lower than the predetermined minimum level; and by (e) generating the power off command in response to the error signal. In this case, the (d) generating may be attained by generating a blocking error signal when the radiation of electromagnetic wave in the current radiation direction of the antenna is inhibited; by generating an unlock signal when the reception signal level is equal to or lower than the predetermined minimum level; and by generating the error signal based on the blocking error signal and the unlock signal.

Also, the (c) generating may further includes: generating a high voltage power off command to the amplifier such that the amplifier stops an operation thereof in response to the high voltage power off command, when the amplified signal is outputted from the amplifier in a state in which the power off command can be generated. In this case, the (c) generating may be attained by generating the high voltage power off command to the amplifier, when the radiation of electromagnetic wave in the current radiation direction of the antenna is inhibited, and when the amplifier outputs the amplified signal.

Also, the (c) generating may be attained (f) generating an error signal to the data processor, when radiation of electromagnetic wave in the current radiation direction of the antenna is inhibited, or when the reception signal level by the antenna is equal to or lower than the predetermined minimum level, and the high voltage power off command to the amplifier, when the amplified signal is outputted from the amplifier in the state in which the radiation of electromagnetic wave in said current radiation direction of the antenna is inhibited; and by (g) generating the power off command in response to an error signal. In this case, the (f) generating may be attained by generating a blocking error signal when radiation of electromagnetic wave in the current radiation direction of the antenna is inhibited, and the high voltage power off command to the amplifier, when the amplified signal is outputted from the amplifier in the state in which the radiation of electromagnetic wave in said current radiation direction of said antenna is inhibited; by generating an unlock signal when the reception signal level is equal to or lower than the predetermined minimum level; and by generating the error signal based on the blocking error signal and the unlock signal.

BRIEF DESCRIPTION OF THE DRAWINGS

FIGS. 3A to 3C, 4A to 4C, 5A to 5D, 6A to 6D and 7A to 7D are timing charts showing the operation of the spacecraft to which the electromagnetic wave radiation controlling apparatus according to the embodiment of the present invention is applied.

DESCRIPTION OF THE PREFERRED EMBODIMENTS

Hereinafter, a electromagnetic wave radiation control apparatus of the present invention will be described below in detail with reference to the attached drawings. The electromagnetic wave radiation control apparatus according to an embodiment of the present invention is designed for use in a spacecraft. Nonetheless, the invention is not limited to one for use in the spacecraft. Rather, the present invention can be applied to an apparatus for controlling the radiation of electromagnetic wave, which is designed for use in facilities on the ground.

Figure 1:
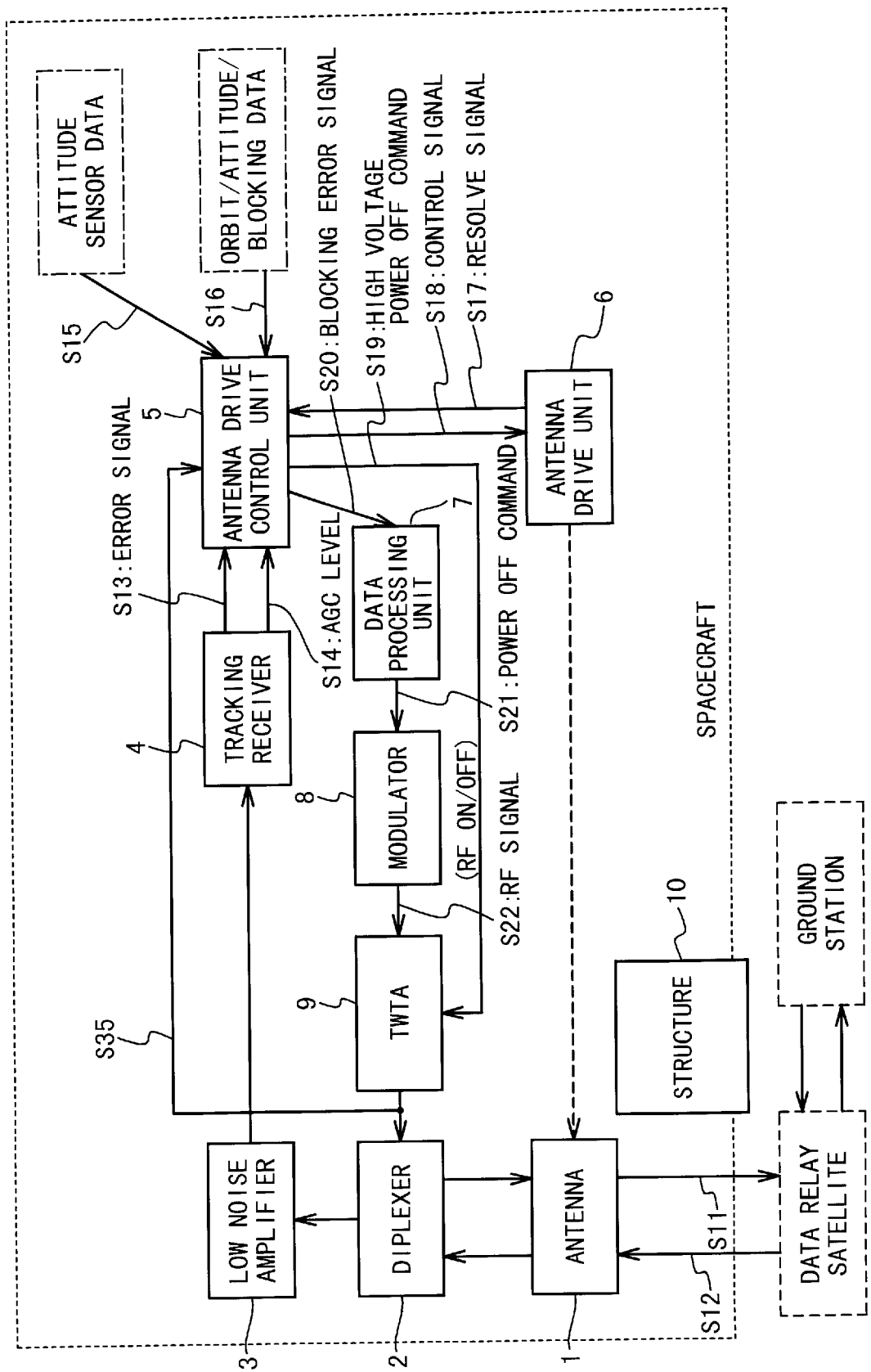
FIG. 1 is a block diagram showing the structure of a spacecraft to which a electromagnetic wave radiation controlling apparatus according to an embodiment of the present invention.

FIG. 1 is a block diagram of a spacecraft to which the apparatus and method for controlling the radiation of electromagnetic wave according to this invention are applied. To state more correctly, FIG. 1 mainly shows the components which are related to the control of the radiation of electromagnetic wave. The spacecraft shown in FIG. 1 is a part of a space station that includes a main body (not shown).

The spacecraft is composed of an antenna 1, a diplexer 2, a low noise amplifier 3, a tracking receiver 4, an antenna drive control unit 5, an antenna drive unit 6, a data processing unit 7, a modulator 8, and a traveling wave tube amplifier (TWTA) 9. A structure 10 is composed of structural components of the spacecraft and space station.

The antenna 1 receives electromagnetic wave from a data relay satellite and transmits electromagnetic wave to the data relay satellite. The antenna drive unit 6 drives the antenna 1 to turn and track the data relay satellite. The antenna 1 converts electromagnetic wave S12 transmitted from the data relay satellite, into a electromagnetic wave signal. The electromagnetic wave signal is supplied to the diplexer 2. The diplexer 2 supplies a signal to be transmitted, to the antenna 1. The antenna 1 converts the transmission signal supplied from the diplexer 2 into electromagnetic wave S11 to transmit to the data relay satellite. It should be noted that the data relay satellite relays electromagnetic wave between the spacecraft to the ground station.

The diplexer 2 controls the transmitting operation from the antenna 1 and the receiving operation by the antenna 1. The diplexer 2 supplies a signal from the antenna 1 to the low noise amplifier 3, and supplies a transmission signal from the TWTA 9 to the antenna 1. The low noise amplifier 3 amplifies the signal supplied from the diplexer 2 and supplies the same to the tracking receiver 4, in order to achieve high sensitivity reception.

The tracking receiver 4 detects an error signal S13 from the signal (sum-difference composite signal) supplied from the antenna 1 through the diplexer 2 and the low noise amplifier 3. The detected error signal S13 is supplied to the antenna drive control unit 5. Also, the tracking receiver 4 detects an AGC level of the reception signal supplied from the antenna 1 via the diplexer 2 and the low noise amplifier 3. The detected AGC level signal S14 is supplied to the antenna drive control unit 5. The antenna drive control unit 5 uses the error signal S13 and the AGC level signal S14 to track the data relay satellite.

The antenna drive control unit 5 receives the following signals, in addition to the error signal S13 and AGC level signal S14 supplied from the tracking receiver 4. That is, an attitude sensor data signal S15 is supplied to the antenna drive control unit 5 from various attitude sensors provided on the spacecraft, such as a solar sensor, an earth sensor, and a gyroscope. An orbit/attitude/blocking data signal S16 is supplied to the antenna drive control unit 5 from the main body of the space station. A resolver signal S17 is supplied from the antenna drive unit 6 to the antenna drive control unit 5.

The antenna drive control unit 5 carries out a calculation process to direct the antenna 1 to the data relay satellite based on the error signal S13, the attitude sensor data signal S15, the orbit/attitude/blocking data signal S16 and the resolver signal S17. Data obtained through the calculation process to drive the antenna 1 to a direction, i.e., antenna direction control data is supplied to the antenna drive unit 6 as a control signal S18. The antenna drive unit 6 drives the antenna 1 to direct to the data relay satellite in accordance with the control signal S18.

Also, the antenna drive control unit 5 generates a blocking error signal S20 and a high voltage power off command S19 based on the attitude sensor data S15, the orbit/attitude/blocking data signal S16, the AGC level signal S14 and an output monitor signal S35 of the TWTA 9 such that the operation of the TWTA 9 can be turned off. The blocking error signal S20 is supplied to the data processing unit 7 to stop the power supply to the modulator 8, and the high voltage power off command S19 is supplied directly to the TWTA 9 to stop the high voltage power supply to the TWTA 9.

Further, the antenna drive control unit 5 determines a lock status based on the AGC level signal S14 supplied from the tracking receiver 4. If the determination result indicates an unlock state of the antenna 1, the antenna drive control unit 5 generates and supplies the blocking error signal S20 to the data processing unit 7. The antenna drive control unit 5 will be described later in greater detail.

The antenna drive unit 6 drives the antenna 1 in response to the control signal S18 supplied from the antenna drive control unit 5. The antenna drive unit 6 generates the resolver signal S17 that represents the current direction of the antenna 1. The resolver signal S17 is supplied to the antenna drive control unit 5.

The data processing unit 7 generates a power off command S21 in response to the blocking error signal S20 supplied from the antenna drive control unit 5. The power off command S21 is supplied to the modulator 8.

The modulator 8 modulates carrier wave based on a data signal to produce a electromagnetic wave signal S22. During the modulation, various data to be transmitted from the spacecraft to the data relay satellite are modulated on the carrier wave. The electromagnetic wave signal S22 obtained through the modulator 8 is supplied to the TWTA 9. The power supply to the modulator 8 is turned off in accordance with the power off command S21 supplied from the data processing unit 7.

The TWTA 9 amplifies the electromagnetic wave signal supplied from the modulator 8 to supply to the antenna 1 and to supply to the antenna drive control unit 5 as an output monitor signal S35. Also, the power supply to the TWTA 9 is turned off in accordance with the high voltage power off command S19 supplied from the antenna drive control unit 5.

The structure 10 is composed of devices provided on the space station such as solar cell paddles, radiators, and assemblies, and prevents radiation and incidence of electromagnetic wave from and to the antenna 1.

Figure 2:
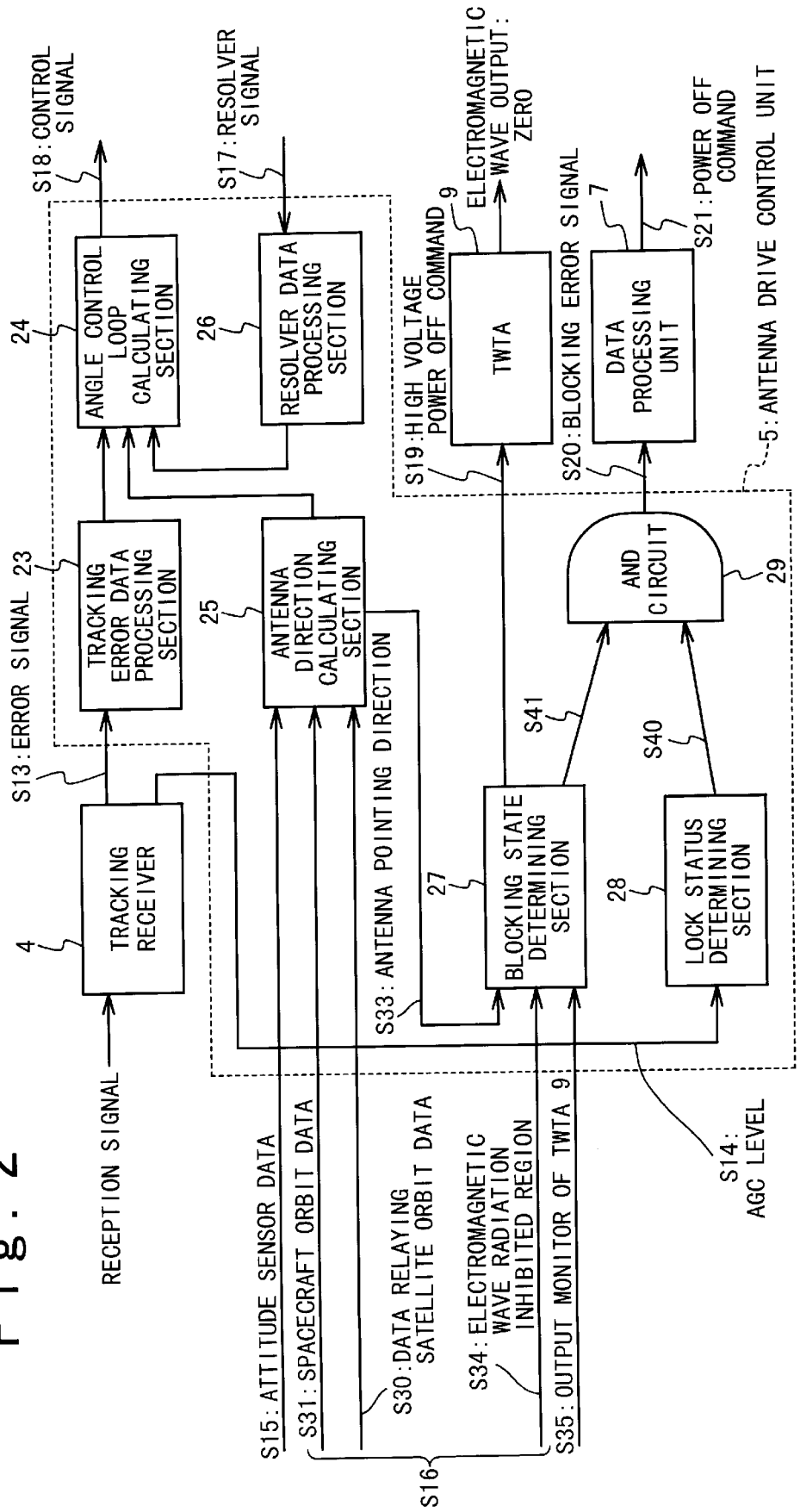
FIG. 2 is a block diagram showing the detailed structure of an antenna drive control unit shown in FIG. 1.

Next, the above antenna drive control unit 5 will be described in detail with reference to the block diagram of FIG. 2. As shown in FIG. 2, the antenna drive control unit 5 is composed of a tracking error data processing section 23, an angle control loop calculating section 24, an antenna direction calculating section 25, a resolver data processing section 26, a blocking state determining section 27, a lock status determining section 28, and an AND circuit 29.

The tracking error data processing section 23 generates error data from the error signal S13 supplied from the tracking receiver 4. The error data is supplied to the angle controlling loop calculating section 24.

The resolver data processing section 26 generates resolver data from the resolver signal S17 supplied from the antenna drive unit 6. The resolver data is supplied to the angle control loop calculating section 24, and the antenna direction calculating section 25.

The antenna direction calculating section 25 calculates the pointing direction of the antenna 1 to be directed based on the attitude sensor data S15 supplied from the attitude sensors, satellite orbit data S30, and spacecraft orbit data S31 which are contained in the orbit/attitude/blocking data S16 supplied from the main body of the space station. The antenna direction calculating section 25 supplies the calculation result to the angle control loop calculating section 24 and the blocking state determining section 27 as an antenna pointing direction data S33.

The angle control loop calculating section 24 receives the error data from the tracking error data processing section 23, the antenna pointing direction data S33 from the antenna pointing direction calculating section 25, the resolver data from the resolver data processing section 26. The calculating section 24 generates a control signal S18 based on the above received data. The control signal S18 is supplied to the antenna drive unit 6 as described above.

The blocking state determining section 27 receives the antenna pointing direction data S33 from the antenna pointing direction calculating section 25, the radiation inhibited region data S34 contained in the orbit/attitude/blocking data S16 from the space station main body, and the output monitor signal S35 outputted from the TWTA 9. Based on the data S33, data S34 and signal S35, the blocking state determining section 27 generates the high voltage power off command S19 and a signal S41 that represents existence or non-existence of a blocking error. The blocking error means that a part of the structure 10 exists in the main lobe of the antenna 1. The signal S41 is set to the logic level of "0" when there is a blocking error, and the logic level of "1" when there is no blocking error. The signal S41 is supplied to one input of the AND circuit 29. The high voltage power off command S19 is supplied to the TWTA 9, as described above.

The lock status determining section 28 determines whether the antenna 1 is in the locked state or the unlocked state, based on the AGC level signal S14 supplied from the tracking receiver 4. The lock status determining section 28 generates a signal S40 that represents the determination result. The signal S40 is set to the logic level of "1" when the antenna 1 is in the unlocked state, and the logic level of "0" when the antenna 1 is in the locked state. The signal S40 is supplied to the other input of the AND circuit 29.

The AND circuit 29 calculates a logic product of the signals S41 supplied from the blocking state determining section 27 and the signal S40 supplied from the lock status determining section 28, and supplies the calculation result as a blocking error signal S20 to the data processing unit 7. The blocking error signal S20 is set to the inactive state of the logic level of "1", when the signal S41 has the logic level of "1" to indicate that there is no blocking error and when the signal S40 has the logic level of "1" to indicate that the antenna 1 is in the unlocked state. In other words, the blocking error signal S20 is set to the active state of the logic level of "0", when the signal S41 has the logic level of "0" to indicate that there is a blocking error, or the signal S40 has the logic level of "0" to indicate that the antenna 1 is in the locked state.

The description will be made of the operation of the electromagnetic wave radiation controlling apparatus in case where the radiation of electromagnetic wave S11 from the antenna 1 should be suppressed, in the spacecraft to which the electromagnetic wave radiation controlling apparatus having the above structure is applied. It is necessary to control the radiation of the electromagnetic wave in the spacecraft having the complicated structure 10 such as a space station such that the electromagnetic wave is erroneously not radiated when there is the structure 10 in the main lobe of the antenna 1.

To this end, the antenna drive control unit 5 allows the antenna 1 to emit the electromagnetic wave S11 when the determination result of the lock status which has been determined based on the AGC level signal S14 supplied from the tracking receiver 4 indicates the locked state, and when the structure 10 is stayed outside the main lobe of the antenna 1 directing to the data relay satellite.

To be more specific, the lock status determining section 28 of the antenna drive control unit 5 receives the AGC level signal S14 from the tracking receiver 4. The lock status determining section 28 determines whether the antenna 1 is in the locked state or in the unlocked state, to generate the signal S40 indicative of the determination result. The signal S40 is supplied to the AND circuit 29. In this case, if the signal S40 has the logic level of "0" to indicate that the antenna 1 is in the locked state, the AND circuit 29 generates and supplies the blocking error signal S20 having the logic level of "0" to the data processing unit 7. The data processing unit 7 generates and supplies the power off command S21 to the modulator 8 in response to the blocking error signal S20. Upon receipt of the power off command S21, the power supply to the modulator 8 is stopped so that the modulator 8 turns off the electromagnetic wave signals S22. As a result, the TWTA 9 has no input at all to have no output from the TWTA 9, so that the radiation of electromagnetic wave from antenna 1 is controlled to be suppressed.

Also, the blocking state determining section 27 of the antenna drive control unit 5 determines whether the structure 10 exists in the main lobe of the antenna 1 when the antenna 1 is directed to the data relay satellite, namely, whether there is a blocking error, based on the antenna pointing direction data S33 supplied from the antenna pointing direction calculating section 25 and the radiation inhibited region data S34 supplied from the space station main body. The blocking state determining section 27 generates the signal S41 indicative of the determination result to the AND circuit 29. In this case, if the signal S41 has the logic level of "0" to indicate that there is the blocking error, the AND circuit 29 generates and supplies the blocking error signal S20 having the logic level of "0" to the data processing unit 7. In this way, the radiation of electromagnetic wave S11 from the antenna 1 can be controlled to be suppressed as in the case where the lock status indicates the locked state.

Through the above operation, the electromagnetic wave S11 is emitted from the antenna 1 when the lock status determined based the AGC level signal S14 supplied from the tracking receiver 4 indicates the unlocked state, and when the structure exists outside the main lobe of the antenna 1 directed to the data relay satellite. This helps to secure high safety.

The blocking state determining section 27 of the antenna drive control unit 5 outputs the high voltage power off command S19 to the TWTA 9 when the output from the TWTA 9 has the logic level of "0" to indicate that there is an blocking error, after the blocking state determining section 27 has outputted the signal 41 having the logic level of "0". The high voltage power supply of the TWTA 9 is turned off in response to the high voltage power off command S19. As a result, the radiation of electromagnetic wave S11 from the antenna 1 is suppressed. Hence, the safety can be enhanced, because the radiation of electromagnetic wave S11 from the antenna 1 is suppressed even if the power supply of the modulator 8 cannot be stopped due to some cause.

As mentioned above, the on/off control of the power supply of the modulator 8 is primarily and the on/off control of the power supply of the TWTA 9 is provided for back-up. This is because it is necessary to provide some redundant means to control the radiation of electromagnetic wave from the viewpoint of high safety, and the number of times the power supply of the TWTA 9 can be turned on and off is limited because of the characteristics of the TWTA 9.

Next, the description will be made of the operation of the spacecraft to which the electromagnetic wave radiation controlling apparatus according to the embodiment of the present invention is applied, with reference to the timing charts of FIGS. 3A to 3C, 4A to 4C, 5A to 5D, 6A to 6D, and 7A to 7D.

FIGS. 3A to 3C show the situation of the radiation of electromagnetic wave when the data relay satellite is invisible from the spacecraft and then becomes visible therefrom during the normal operation, while the structure 10 is stayed outside the view field of the antenna 1, and then changes into the invisible state. In this case, when the state changes from the invisible state to the visible state, the lock status of the tracking receiver 4 changes from the logic level of "0" to the logic level of "1". As a result, the power supply of the modulator 8 is turned on in response to the change of the lock status, whereby the antenna 1 starts emitting electromagnetic wave S11, as shown in FIG. 3C. When the satellite becomes invisible thereafter, the lock status of the tracking receiver 4 changes from the logic level of "1" to the logic level of "0". At this time, the power supply of the modulator 8 is turned off, whereby the antenna 1 stops emitting electromagnetic wave S11, as shown in FIG. 3C.

FIGS. 4A to 4C show the situation of the radiation of electromagnetic wave when the data relay satellite is first in the state invisible from the spacecraft and then changes to the state visible therefrom during the normal operation, while the structure 10 enters the view field of the antenna 1, and then goes out the view field. In this case, the lock status of the tracking receiver 4 changes from the logic level of "0" to the logic level of "1" when the data relay satellite changes from the invisible state to the visible state. Therefore, the power supply of the modulator 8 is turned on, whereby the antenna 1 starts emitting electromagnetic wave S11, as shown in FIG. 4C. However, when the blocking error is detected due to the existence of the structure 10 (obstacle) while the power supply of the modulator 8 remains turned on, the power supply of the modulator 8 is turned off in a short time (about one second or less), so that the antenna 1 emits no electromagnetic wave S11 at all, as shown in FIG. 4C.

FIGS. 5A to 5D show the situation of the radiation of electromagnetic wave when the lock status of the tracking receiver 4 changes from the logic level of "1" to the logic level of "0" due to some cause during the period during which any blocking error caused due to the structure 10 is not detected after the data relay satellite changes the state invisible from the spacecraft to the state visible therefrom during the normal operation. In this case, the power supply of the modulator 8 changes from the turned-on state to the turned-off state in synchronism with the lock status, so that the antenna 1 stops emitting electromagnetic wave S11, as shown in FIG. 5D. This enhances the safety.

FIGS. 6A to 6D show the situation where the modulator 8 is turned on due to some trouble in the state in which the data relay satellite remains invisible from the spacecraft. In this case, because the lock status of the tracking receiver 4 remains having the logic level of "0", the antenna 1 emits no electromagnetic wave S11, as shown in FIG. 6D.

FIGS. 7A to 7D show the situation that a trouble may occur in the antenna drive unit 6. In this case, the antenna 1 on the spacecraft cannot be directed to the data relay satellite. Therefore, the lock status of the tracking receiver 4 has the logic level of "0". Thus, the power supply of the modulator 8 cannot be turned on, so that the antenna 1 emits no electromagnetic wave S11, as shown in FIG. 7D. This also enhances the safety.

As has been described, the antenna radiation controlling apparatus according to the embodiments of the present invention, the determination result of the lock status obtained from the AGC level signal S14 supplied from the tracking receiver 4 is used for determination of whether or not the electromagnetic wave should be radiated. Therefore, the following advantages can be obtained.

That is, the frequency used for the data relay satellite falls within the Ka band (23 to 26 GHz). The antenna 1 on the spacecraft cannot receive the electromagnetic wave S12 from the data relay satellite as long as the structure 10 stays in the main lobe of the spacecraft. Consequently, the AGC level signal S14 outputted from the tracking receiver 4 is reduced. The lock status of the receiver 4 obtained from the AGC level signal S14 indicates an unlocked state. Hence, the antenna drive control unit 5 supplies the blocking error signal S20 to the data processing unit 7.

In this way, the data processing unit 7 generates the power off command S21 in response to the blocking error signal S20, which is supplied to the modulator 8. Upon receipt of the command S21, the modulator 8 turns off the electromagnetic wave signal S22 as its output, so that nothing is inputted to the TWTA 9. Therefore, the antenna 1 stops emitting electromagnetic wave S11. Thus, no electromagnetic wave is emitted while the structure 10 of the spacecraft exists in the main lobe of the antenna 1.

More specifically, the radiation of electromagnetic wave is controlled even if the following trouble is caused. For example, when the resolver signal S17 supplied from the antenna drive unit 6 is erroneous, there is a case that the antenna 1 directs to the structure 10. Even in this case, the antenna 1 does not emit electromagnetic wave S11 at all, because the lock status obtained from the AGC level signal S14 supplied from the tracking receiver 4 indicates that the antenna 1 is in the locked state.

Also, the high voltage power off command S19 is supplied to the TWTA 9 so that the electromagnetic wave S11 emitted from the antenna 1 may not be applied to the structure 10. There is a possibility that the TWTA 9 cannot receive the high voltage power off command S19 due to a trouble in the input circuit of the TWTA 9. In this case, the antenna 1 may inevitably be directed to the structure 10. Even in this case, the radiation of electromagnetic wave S11 from the antenna 1 can be controlled to be suppressed in the same manner as described above.

Further, according to the electromagnetic wave radiation controlling apparatus according to the embodiment of the present invention, the detection of the structure 10 is made by means of an ordinary antenna for transmitting and receiving data signals. Therefore, no special antenna needs to be used to detect the detection of the structure 10. This renders it easy and economical to manufacture the electromagnetic wave radiation controlling apparatus of the present invention.

What is claimed is:

1. An electromagnetic wave radiation control apparatus comprising:
    an antenna;
    a modulator which modulates a carrier wave based on a transmission signal to output a modulated signal, wherein said modulator stops outputting said modulated signal in response to a first power off command;
    an amplifier which amplifies said modulated signal such that said amplified signal is radiated as an electromagnetic wave from said antenna when said modulated signal is outputted from said modulator; and
    a radiation control unit which generates said first power off command to said modulator both when radiation of electromagnetic waves in a current radiation direction of said antenna is inhibited and when a level of a reception signal received by said antenna is equal to or lower than a predetermined minimum level.

2. The electromagnetic wave radiation control apparatus according to claim 1, wherein said radiation control unit comprises:
    a data processor which outputs said first power off command in response to an error signal; and
    a control unit which generates said error signal to said data processor both when the radiation of electromagnetic waves in said current radiation direction of said antenna is inhibited and when said reception signal level is equal to or lower than the predetermined minimum level.

3. The electromagnetic wave radiation control apparatus according to claim 2, wherein said control unit comprises:
    a blocking state determining section which generates a blocking error signal when the radiation of electromagnetic waves in the current radiation direction of said antenna is inhibited;
    a lock status determining section which generates an unlock signal when said reception signal level is equal to or lower than the predetermined minimum level; and
    a logic circuit which generates said error signal based on said blocking error signal and said unlock signal.

4. The electromagnetic wave radiation control apparatus according to claim 1, wherein said radiation control unit generates a second power off command to said amplifier and said amplified stops operating in response to said second power off command such that said amplified signal is not outputted to said antenna.

5. The electromagnetic wave radiation control apparatus according to claim 4, wherein said radiation control unit generates said second power off command to said amplifier when the radiation of electromagnetic waves in said current radiation direction of said antenna is inhibited.

6. The electromagnetic wave radiation control apparatus according to claim 4, wherein said radiation control unit comprises:
    (A) a data processor which outputs said first power off command in response to an error signal; and
    (B) a control unit which generates:
        (1) said error signal to said data processor both when radiation of electromagnetic waves in said current radiation direction of said antenna is inhibited and when said reception signal level is equal to or lower than said predetermined minimum level, and
        (2) said second power off command to said amplifier when said amplified signal is outputted from said amplifier in a state in which the radiation of electromagnetic waves in said current radiation direction of said antenna is inhibited.

7. The electromagnetic wave radiation control apparatus according to claim 6, wherein said control unit comprises:
    (A) a blocking state determining section which generates:
        (1) a blocking error signal when radiation of electromagnetic waves in the current radiation direction of said antenna is inhibited, and
        (2) said second power off command when said amplified is outputted from said amplifier in a state in which the radiation of electromagnetic waves in said current radiation direction of said antenna is inhibited;
    (B) a lock status determining section which generates an unlock signal when said reception signal level is equal to or lower than said predetermined minimum level; and
    (C) a logic circuit which generates said error signal based on said blocking error signal and said unlock signal.

8. A method of controlling radiation of electromagnetic waves in a spacecraft that includes an antenna, a modulator which modulates a carrier wave based on a transmission signal to output a modulated signal, and an amplifier which amplifies said modulated signal such that said amplified signal is radiated as electromagnetic waves from said antenna when said modulated signal is outputted from said modulator, said method comprising:
    (a) determining whether radiation of electromagnetic waves in a current radiation direction of said antenna is inhibited;
    (b) determining whether a level of a reception signal by said antenna is equal to or lower than a predetermined minimum level; and
    (c) preventing said modulator from applying said modulated signal to said amplifier both when the radiation of electromagnetic waves in the current radiation direction of said antenna is inhibited and when reception signal level is equal to or lower than the predetermined minimum level.

9. The method according to claim 8, wherein said preventing step includes:
    generating an error signal to said data processor both when the radiation of electromagnetic waves in said current radiation direction of said antenna is inhibited and when said reception signal is equal to or lower than the predetermined minimum level; and
    generating a first power off command which is applied to the modulator in response to said error signal.

10. The method according to claim 9, wherein said step of generating said error signal includes:
    generating a blocking error signal when the radiation of electromagnetic waves in the current radiation direction of said antenna is inhibited;

generating an unlock signal when said reception signal level is equal to or lower than the predetermined minimum level; and generating said error signal based on said blocking error signal and said unlock signal.

11. The method according to claim 8, wherein said preventing step further includes:

generating a second power off command to said amplifier such that said amplifier stops an operation thereof in response to said second power off command.

12. The method according to claim 11, wherein said preventing step further includes:

generating said second power off command to said amplifier, when the radiation of electromagnetic waves in said current radiation direction of said antenna is inhibited.

13. The method according to claim 11, wherein said preventing step further includes:

(f) generating an error signal to said data processor, both when the radiation of electromagnetic waves in said current said antenna direction is inhibited and when said reception signal level is equal to or lower than the predetermined minimum level, and generating said second power off command to said amplifier when said amplified signal is outputted from said amplifier in a state in which the radiation of electromagnetic waves in said current radiation direction of said antenna is inhibited;

(g) generating said second power off command in response to an error signal.

14. The method according to claim 13, wherein said step of generating said error signal includes:

generating a blocking error signal when the radiation of electromagnetic waves in the current radiation direction of said antenna is inhibited, and generating said second power off command to said amplifier when said amplified signal is outputted from said amplifier in the state in which the radiation of electromagnetic waves in said current radiation direction of said antenna is inhibited;

generating an unlock signal when said reception signal level is equal to or lower than the predetermined minimum level; and generating said error signal based on said blocking error signal and said unlock signal.

15. An electromagnetic wave radiation control apparatus comprising:

an antenna;

a modulator which modulates a carrier wave based on a transmission signal to output a modulated signal, wherein said modulator stops outputting said modulated signal in response to a first power off command;

an amplifier which amplifies said modulated signal such that an amplified signal is radiated as an electromagnetic wave from said antenna when said modulated signal is outputted from said modulator; and a radiation control unit including:
a data processor which outputs said first power off command in response to an error signal; and
a control unit which further includes:
a blocking state determining section which generates a blocking error signal when the radiation of electromagnetic waves in the current antenna direction is inhibited;
a lock status determining section which generates an unlock signal when a reception signal level is equal to or lower than a predetermined minimum lelvel; and a logic circuit which generates said error signal to said data processor based on said blocking error signal and said unlock signal.

16. An electromagnetic wave radiation control apparatus comprising:

an antenna;

a modulator which modulates a carrier wave based on a transmission signal to output a modulated signal, wherein said modulator stops outputting said modulated signal in response to a first power off command;

an amplifier which amplifies said modulated signal such that an amplified signal is radiated as an electromagnetic wave from said antenna when said modulated signal is outputted from said modulator; and a radiation control unit including:

(A) a data processor which outputs said first power off command in response to an error signal; and (B) a control unit which includes:

(1) a blocking state determining section which generates:
a blocking error signal when the radiation of electromagnetic waves in a current antenna direction is inhibited, and
a second power off command to said amplifier when said amplified signal is outputted from said amplifier in a state in which the radiation of electromagnetic waves in said current antenna direction is inhibited;

(2) a lock status determining section which generates an unlock signal when a reception signal level is equal to or lower than a predetermined minimun level; and (3) a logic circuit which generates said error signal to said data processor based on said blocking error signal and said unlock signal.

17. A method of controlling radiation of electromagnetic waves in a spacecraft which includes an antenna, a modulator which modulates a carrier wave based on a transmission signal to output a modulated signal, and an amplifier which amplifies said modulated signal such that an amplified signal is radiated as electromagnetic wave from said antenna when said modulated signal is outputted from said modulator, said method comprising:

(a) determining whether the radiation of electromagnetic waves in a current antenna direction is inhibited;

(b) determining whether a level of a reception signal by said antenna is equal to or lower than a predetermined minimum level; and (c) preventing said modulator from applying said modulated signal to said amplifier by:
generating a blocking error signal when the radiation of electromagnetic waves in the current antenna direction is inhibited;
generating an unlock signal when said reception signal level is equal to or lower than said predetermined minimum level;
generating an error signal based on said blocking error signal and said unlock signal; and
generating a first power off command which is applied to said modulator in response to said error signal.

18. A method of controlling radiation of electromagnetic waves in a spacecraft wherein said spacecraft includes an antenna, a modulator which modulates a carrier wave based on a transmission signal to output a modulated signal, and an amplifier which amplifies said modulated signal such that said amplified signal is radiated as electromagnetic waves from said antenna when said modulated signal is outputted from said modulator, said method comprising:

(a) determining whether the radiation of electromagnetic waves in a current antenna direction is inhibited;

(b) determining whether a level of a reception signal by said antenna is equal to or lower than a predetermined minimum level; and (c) preventing said modulator from applying said modulated signal to said amplifier by:

generating a second power off command to said amplifier such that said amplifier stops an operation thereof in response to said second power off command;

generating a blocking error signal when the radiation of electromagnetic waves in the current antenna direction is inhibited, and generating said second power off command to said amplifier when said amplified signal is outputted from said amplifier in the state in which the radiation of electromagnetic waves in said current radiation direction of said antenna is inhibited;

generating an unlock signal when said reception signal level is equal to or lower than the predetermined minimum level;

generating an error signal based on said blocking error signal and said unlock signal; and generating a first power off command to said modulator in response to said error signal such that said modulator stops the output of said modulated signal to said amplifier.

* * * * *